INVENTOR.
James L. Mason
BY
George A. Schmidt
ATTORNEY

United States Patent Office 3,181,663
Patented May 4, 1965

3,181,663
FASTENING MEANS
James L. Mason, Rochester, Mich., assignor to General
Motors Corporation, Detroit, Mich., a corporation of
Delaware
Filed Feb. 13, 1962, Ser. No. 172,898
1 Claim. (Cl. 189—88)

This invention relates to fastening means, and more particularly to a means for securing a molding strip to a support.

In the design and manufacture of structures such as motor vehicles, it is common practice to utilize decorative molding strips at various locations in order to add the aesthetic value of the structure or to cover up objectionable seams or flanges in the sheet metal.

It is the general practice to secure molding strips to support panels by means of fastening devices which are received in the molding strip and are bolted through suitable apertures in the support. A great number of such fastening devices are generally required, particularly where the molding strip extends for a considerable length along the supporting panel. Furthermore, molding strips are not always of constant cross-sectional dimension or configuration and it may be necessary to utilize different sized or different shaped fasteners to secure the molding strip to the support. This presents numerous problems, particularly in the assembly of the structure, and also adds to the overall cost due to the large number and large variety of fastening devices that may be necessary.

The device in which this invention is embodied comprises, generally, a means for securing a molding strip to a support whereby the fastening means is formed directly from the supporting panel and over which the molding strip is received. In the preferred embodiment of the invention a plurality of tabs are struck from the surface of the supporting panel in such a manner as to properly receive and retain the molding strip.

The resulting construction eliminates the use of a large number or variety of molding fasteners to secure a molding strip to the supporting panel. It is necessary only to snap the molding strip over the tabs at assembly and the problems of location of fasteners and alignment of fasteners are eliminated. The resulting construction is much more economical from the standpoint of the overall vehicle cost and the molding strip is more positively retained and more easily assembled.

These and other advantages will become more apparent from the following description and drawing, in which.

Figure 1:
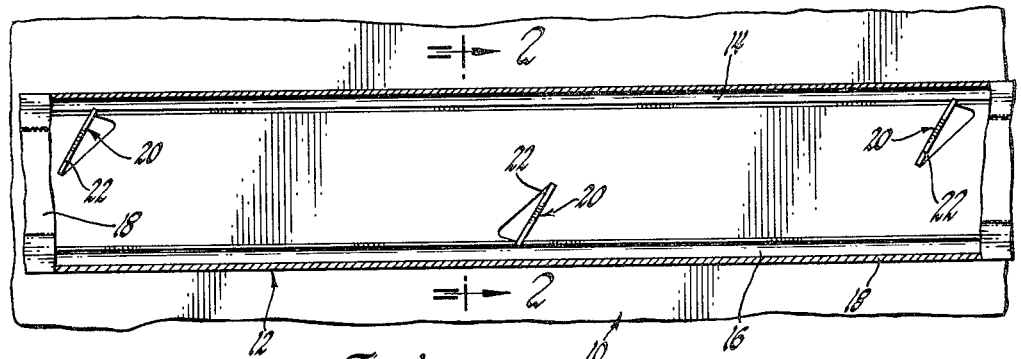
FIGURE 1 is a side view of a support panel and molding strip installation, with parts broken away and in section to illustrate the location of the tab means.
Figure 2:
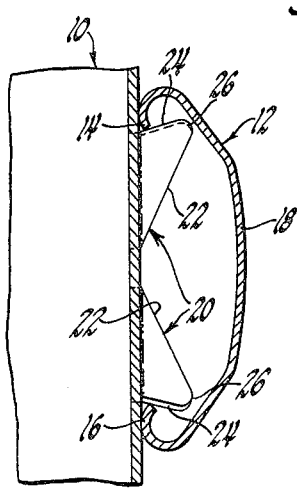
FIGURE 2 is a cross-sectional view of the installation illustrated in FIGURE 1, taken substantially along the line 2—2 of FIGURE 1 and looking in the direction of the arrows.
Figure 3:
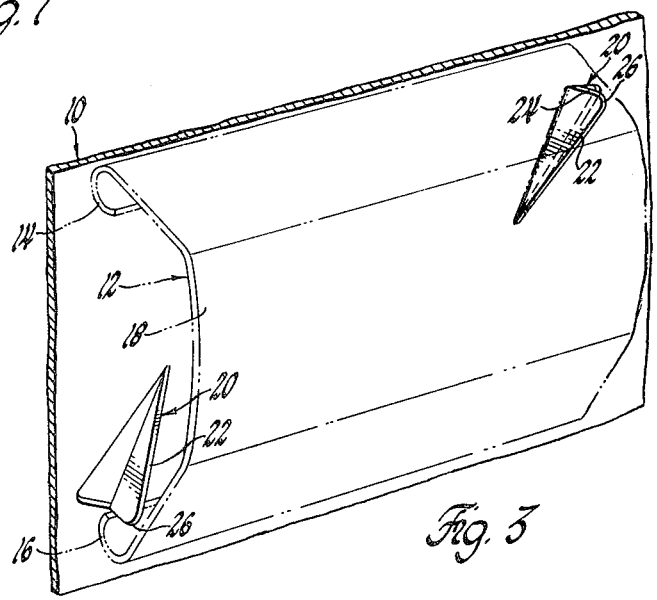
FIGURE 3 is a perspective view of a portion of the installation illustrated in FIGURE 1, with parts broken away and in section to show the cooperation of the various parts.

Referring more particularly to the drawing, FIGURES 1–3 best illustrate the preferred embodiment of the invention. A supporting panel, illustrated generally by the numeral 10, may be a sheet metal body panel or the like forming a part of the body of a motor vehicle. It is to be understood that the invention is not only applicable to motor vehicles but is also adapted to any construction wherein a decorative strip is applied. The following description is related to motor vehicles for ease in explanation.

A generally C-shaped molding strip, illustrated by the numeral 12, is shown to include longitudinal flanges 14 and 16 extending along the edges thereof. The body portion 18 of the molding strip may be of any suitable configuration to blend with the overall styling of the vehicle.

The retention means for securing the molding strip 12 to the support 10 comprises parallel rows of tabs, illustrated generally by the numeral 20, which are struck from the surface of the support panel 10. Tabs 20 may be of any shape but it is preferred that they be triangular, as illustrated in FIGURES 1–3. Each of tabs 20 is shown to include an edge 22 which extends upwardly and outwardly from the surface of the supporting panel 10. Edge 22 may be described as the hypotenuse of the triangle formed by the tabs 20. A second edge 24 extends from the end of edge 22 to the support 10 and may be considered a leg of the triangle formed by the tabs 20. The included angle between edges 22 and 24 is an acute angle for reasons to be later described. The third leg of the triangle formed by the tabs 20 lies along the surface of the support panel 10 and may be defined by the bend line 26 joining the inner end of edge 22 and the lower end of edge 24. An arcuate surface 26 may be provided between edges 22 and 24 for ease in mounting the molding strip as will be later described.

Tabs 20 are arranged along the support panel 10 in parallel rows. The tabs 20 may be staggered, as illustrated in FIGURE 1, or may be directly opposite each other, depending on the requirements of the molding strip retention. The parallel rows of tabs would extend the length of the molding strip and would be spaced as desired, depending on the requirements of retention of the molding strip. It is to be noted that the distance between the junction points of edges 22 and 24 of opposite tabs is greater than the distance between junction points of legs 24 and the support panel 10. This is for securing the molding strip 12 against the panel 10 in the proper relation.

In mounting molding strip 12 over the tab means 20 the molding strip flanges 14 and 16 are placed against the arcuate edges 26 and pressed against the supporting panel 10. The edges of flanges 14 and 16 spread slightly as they ride over arcuate surfaces 26 and tend to return to their original position against the inward parts of edges 24. The angle of edges 24 relative to the support panel 10 prevent the removal of the molding strip under normal vibrations or unless the molding strip is actually pulled away from the support 10.

Figure 5:
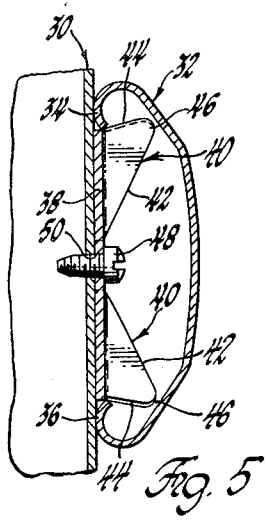
FIGURE 5 is a cross-sectional view of the installation shown in FIGURE 4, taken substantially along the line 5—5 of FIGURE 4 and looking in the direction of the arrows.
Figure 4:
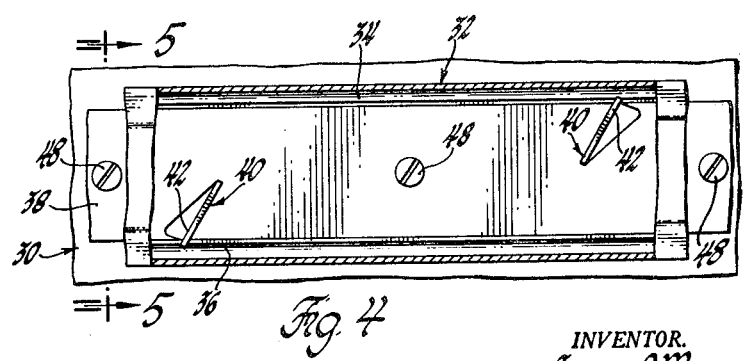
FIGURE 4 is a view of a molding strip installation utilizing a modification of the means from which the tabs are formed.

A modification of the above-described construction is illustrated in FIGURES 4 and 5. In this instance a support panel 30 is to have secured thereto a molding strip, illustrated generally by the numeral 32. Molding strip 32 is provided with inturned flanges 34 and 36 and is of suitable cross-sectional configuration, depending on the styling of the vehicle construction. A sheet metal strip 38 is provided with tabs 40 of the same shape and configuration as above-described with respect to tabs 20. Tabs 40 have edges 42 and 44 and an arcuate joining edge 46 to permit retention of the molding strip 32 against the panel 30. Tab strip 38 is bolted or otherwise secured to the supporting panel 30 by means of bolts or screws 48. Suitable apertures 50 may be formed in the support panel 30 to receive the fastening device 48.

The purpose of the modified construction is to provide proper molding retention means in instances where the supporting panel might be subject to weather conditions causing corrosion in the supporting panel. The operation of the modification illustrated in FIGURES 4 and 5 is susbtantially the same as that described with respect to the modification illustrated in FIGURES 1–3.

Thus, a molding strip installation is provided which eliminates the use of a large number of fastening devices to secure the molding strip to the support. The tabs may be formed in the body panel at the same time the body panel is formed or may be applied a later time. The tabs are so positioned to properly retain the molding strip under normal conditions and permits the removal or replacement of the molding strip as is necessary. The assembly of the installation is extremely simple, and in the preferred form of the invention does not require the use of screws, bolts or nuts. The resulting construction is extremely economical and simple to assemble.

What is claimed is:

A molding strip installation comprising:

a support panel having two parallel rows of triangular tabs struck therefrom and extending generally perpendicularly from the surface thereof, each of said tabs having a first edge extending angularly from the surface of said panel and a second edge extending from said panel and forming an acute angle with said first edge, the junction between said first and second edges of each of said tabs of one of said parallel rows of triangular tabs being more remote from the other of said parallel rows of triangular tabs than the junction between said second edge and said panel is from said other of said parallel rows of triangular tabs, said triangular tabs being struck from said support panel at an angle with a line parallel rows of said triangular tabs such that the opening resulting in said panel lies closer to the other of said parallel rows of triangular tabs than does said junction between said first and scond edges such that the openings lie between said parallel rows of triangular tabs and a portion of said panel member remains intact directly below the junction between said first and second edges of each of said tabs;

and a generally C-shaped molding strip having inturned flanges extending along the edges thereof, said molding strip being received over said two parallel rows of triangular tabs with one of said flanges engaging said second edges of said tabs in one of said parallel rows of triangular tabs and the other of said flanges engaging said second edges of said tabs in the other of said parallel rows of triangular tabs, said molding strip abutting said portion of said panel which remains below the junction of said first and second edges of each of said tabs.

References Cited by the Examiner
UNITED STATES PATENTS

| | | |
|---|---|---|
| 1,150,790 | 8/15 | Swanson. |
| 1,223,289 | 4/17 | Otte. |
| 2,110,841 | 3/38 | Maier. |
| 2,192,309 | 3/40 | Hall _____ 189—88 |
| 2,221,854 | 11/40 | Zalkind. |

JACOB L. NACKENOFF, *Primary Examiner.*

UNITED STATES PATENT OFFICE
CERTIFICATE OF CORRECTION

Patent No. 3,181,663

May 4, 1965

James L. Mason

It is hereby certified that error appears in the above numbered patent requiring correction and that the said Letters Patent should read as corrected below.

Column 1, line 14, after "add" insert -- to --; column 2, line 70, for "device" read -- devices --; column 4, line 3, before "rows" insert -- to said parallel --.

Signed and sealed this 21st day of September 1965.

(SEAL)
Attest:

ERNEST W. SWIDER
Attesting Officer

EDWARD J. BRENNER
Commissioner of Patents